United States Patent
Lai et al.

(10) Patent No.: US 12,367,998 B2
(45) Date of Patent: Jul. 22, 2025

(54) TRANSFORMER

(71) Applicants: Chicony Power Technology Co., Ltd., New Taipei (TW); National Taipei University of Technology, Taipei (TW)

(72) Inventors: Yen-Shin Lai, Taipei (TW); Yong-Yi Huang, Taipei (TW); Hao-Chieh Chang, New Taipei (TW)

(73) Assignees: CHICONY POWER TECHNOLOGY CO., LTD., New Taipei (TW); NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 839 days.

(21) Appl. No.: 17/474,578

(22) Filed: Sep. 14, 2021

(65) Prior Publication Data
US 2022/0084734 A1 Mar. 17, 2022

(30) Foreign Application Priority Data

Sep. 17, 2020 (TW) .................................. 109132176
Aug. 16, 2021 (TW) .................................. 110130180

(51) Int. Cl.
*H01F 27/24* (2006.01)
*H01F 27/28* (2006.01)

(52) U.S. Cl.
CPC ......... *H01F 27/24* (2013.01); *H01F 27/2823* (2013.01)

(58) Field of Classification Search
CPC ...... H01F 27/24; H01F 27/2823; H01F 27/38; H01F 3/10; H01F 2027/2819; H01F 27/306; H01F 27/2804; H01F 2027/2809; H02M 1/0064; H02M 3/003; H02M 3/285; H02M 3/33561
See application file for complete search history.

(56) References Cited

U.S. PATENT DOCUMENTS

| | | | |
|---|---|---|---|
| 6,288,898 B1 * | 9/2001 | Johnson | .................... G06F 1/20 165/185 |
| 2007/0262842 A1 | 11/2007 | Chan et al. | |
| 2008/0048814 A1 | 2/2008 | Weger | |
| 2008/0239759 A1 | 10/2008 | Nakahori | |
| 2010/0321960 A1 * | 12/2010 | Nakahori | .......... H02M 3/33573 363/21.04 |

(Continued)

FOREIGN PATENT DOCUMENTS

| | | |
|---|---|---|
| CN | 105869855 | 8/2016 |
| CN | 109087788 | 12/2018 |

(Continued)

*Primary Examiner* — Mang Tin Bik Lian
(74) *Attorney, Agent, or Firm* — Birch, Stewart, Kolasch & Birch, LLP

(57) ABSTRACT

A transformer includes a magnetic core set and 2N pairs of windings. The magnetic core set includes a first magnetic core, a second magnetic core, a first magnetic column, and a second magnetic column. Each of the pairs of windings includes a high-voltage side winding and a low-voltage side winding. Each of the pairs of the windings surrounds one of the first and the second magnetic columns. The surrounding direction of the high-voltage side windings surrounding the first magnetic core is opposite to the surrounding direction of the high-voltage side windings surrounding the second magnetic core.

20 Claims, 10 Drawing Sheets

(56) References Cited

U.S. PATENT DOCUMENTS

| | | | | |
|---|---|---|---|---|
| 2011/0211369 A1* | 9/2011 | Mulcahy | ............... | H02M 3/285 |
| | | | | 363/20 |
| 2015/0188509 A1* | 7/2015 | Paepoot | ................... | H03H 7/09 |
| | | | | 336/170 |
| 2017/0309395 A1* | 10/2017 | Shiraki | ............... | H02M 1/4208 |
| 2018/0025828 A1 | 1/2018 | Nakajima et al. | | |
| 2018/0138801 A1* | 5/2018 | Chen | ................... | H01F 27/2804 |
| 2018/0226182 A1* | 8/2018 | Fe | .......................... | H01F 27/245 |
| 2019/0043660 A1 | 2/2019 | Jin et al. | | |
| 2019/0043661 A1* | 2/2019 | Jin | ........................ | H01F 27/346 |
| 2019/0115149 A1* | 4/2019 | Lu | ........................ | H01F 27/346 |
| 2019/0362885 A1 | 11/2019 | Lu et al. | | |
| 2020/0350117 A1* | 11/2020 | Nabih | ..................... | H01F 27/40 |
| 2020/0395164 A1* | 12/2020 | Ahmed | ............... | H01F 27/2804 |
| 2020/0395844 A1 | 12/2020 | Liu et al. | | |
| 2021/0384754 A1* | 12/2021 | Xu | .......................... | H01F 38/14 |

FOREIGN PATENT DOCUMENTS

| | | |
|---|---|---|
| CN | 109243793 | 1/2019 |
| CN | 208444723 | 1/2019 |
| CN | 110289767 | 9/2019 |
| CN | 111415803 | 7/2020 |
| CN | 111799074 | 10/2020 |
| TW | 202101891 | 1/2021 |
| WO | 2020252251 | 12/2020 |

* cited by examiner

TRANSFORMER

CROSS-REFERENCES TO RELATED APPLICATIONS

This non-provisional application claims priority under 35 U.S.C. § 119(a) to Patent Application No. 109132176 filed in Taiwan, R.O.C. on Sep. 17, 2020 and Patent Application No. 110130180 filed in Taiwan, R.O.C. on Aug. 16, 2021, the entire contents of which are hereby incorporated by reference.

BACKGROUND

Technical Field

The present invention relates to a transformer, and in particular, to a transformer with a plurality of low-voltage side windings.

Related Art

A transformer is adapted to adjust an input voltage to a required voltage. In some applications, the transformer is used to convert a high-voltage input voltage into a low-voltage output voltage. This type of transformer includes a high-voltage side coil and a low-voltage side coil. The number of turns of windings of the high-voltage side coil is greater than that of the low-voltage side coil. The high-voltage side coil receives a high-voltage input voltage to generate a magnetic field, and the low-voltage side coil generates a low-voltage output voltage in response to the magnetic field. A voltage ratio of the input voltage to the output voltage corresponds to a turns ratio of windings of the high-voltage side coil to the low-voltage side coil.

In different application scenarios, a single transformer includes a plurality of sets of high-voltage side coils and low-voltage side coils. The plurality of sets of high-voltage side coils and low-voltage side coils are integrated into a single transformer. The volume of the transformer is relatively large.

SUMMARY

In view of this, according to some embodiments, a transformer includes a magnetic core set and 2N winding pairs. The magnetic core set includes a first magnetic core, a second magnetic core, and a magnetic column pair. The second magnetic core is parallel to the first magnetic core. The magnetic column pair includes a first magnetic column and a second magnetic column. The first magnetic column is substantially parallel to the second magnetic column. The first magnetic column and the second magnetic column are between the first magnetic core and the second magnetic core. N is a positive integer greater than or equal to 2. Each of the winding pairs includes a high-voltage side winding and a low-voltage side winding. Each of the winding pairs surrounds one of the first magnetic column and the second magnetic column. A first winding direction in which the high-voltage side windings surround the first magnetic column is substantially opposite to a second winding direction in which the high-voltage side windings surround the second magnetic column.

According to some embodiments, the high-voltage side windings are connected in series sequentially, each of the low-voltage side windings includes a plurality of low-voltage side sub-windings, and the low-voltage side sub-windings are connected in parallel.

According to some embodiments, the transformer further includes a circuit board, where the circuit board includes a plurality of winding layers, each of the winding layers includes a winding, and the high-voltage side winding and the low-voltage side winding of at least one of the winding pairs are respectively the windings.

According to some embodiments, N is equal to 2, the high-voltage side windings are connected in series sequentially, each of the low-voltage side windings includes a plurality of low-voltage side sub-windings, and the low-voltage side sub-windings are connected in parallel.

According to some embodiments, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the second winding pair, the third winding pair, the fourth winding pair, the fifth winding pair, and the sixth winding pair are connected in series sequentially.

According to some embodiments, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the sixth winding pair, the fifth winding pair, the second winding pair, the third winding pair, and the fourth winding pair are connected in series sequentially.

In summary, according to some embodiments, the transformer includes 2N winding pairs, and each of the winding pairs surrounds the first magnetic column or the second magnetic column. With this structure, the 2N winding pairs can be effectively integrated into the magnetic core set including the first magnetic column and the second magnetic column, so that the volume of the transformer is reduced.

DETAILED DESCRIPTION

Figure 1:
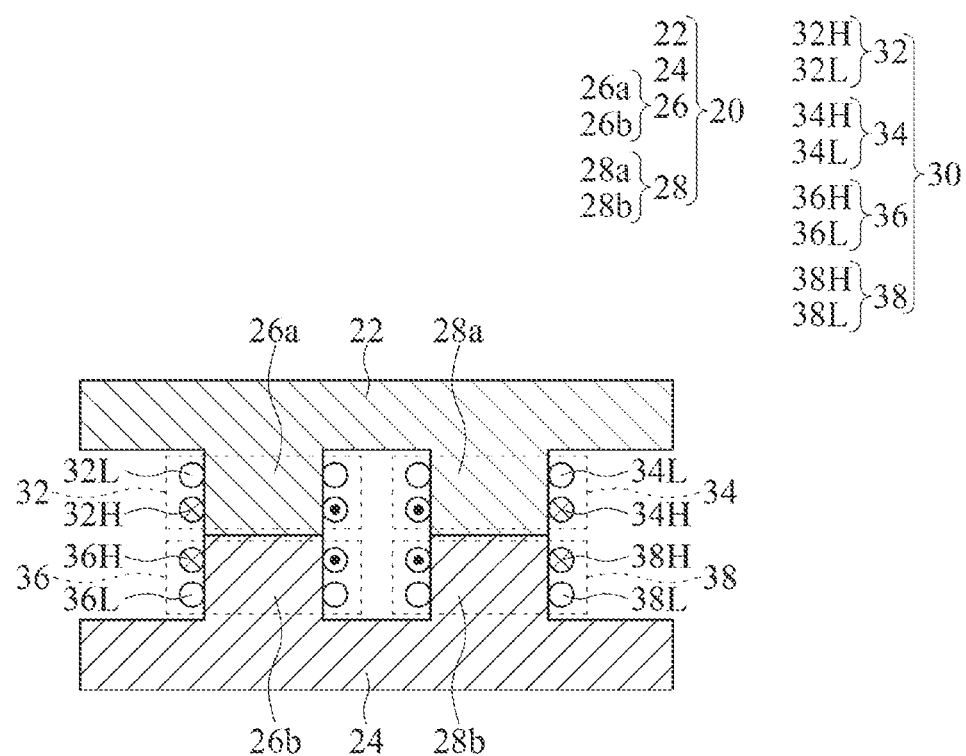
FIG. 1 illustrates a schematic cross-sectional view of a transformer according to some embodiments.

FIG. 1 illustrates a schematic cross-sectional view of a transformer according to some embodiments. The transformer includes a magnetic core set 20 and 2N winding pairs 30. The magnetic core set 20 includes a first magnetic core 22, a second magnetic core 24, and a magnetic column pair 26, 28. The second magnetic core 24 is parallel to the first magnetic core 22. The magnetic column pair 26, 28 includes a first magnetic column 26 and a second magnetic column 28, the first magnetic column 26 is substantially parallel to the second magnetic column 28, and the first magnetic column 26 and the second magnetic column 28 are located between the first magnetic core 22 and the second magnetic core 24. N is a positive integer greater than or equal to 2 (N in the embodiments of FIG. 1 is equal to 2). Each of the winding pairs 32, 34, 36, and 38 includes high-voltage side windings 32H, 34H, 36H, and 38H, and low-voltage side windings 32L, 34L, 36L, and 38L. Each of the winding pairs 32, 34, 36, and 38 surrounds one of the first magnetic column 26 and the second magnetic column 28 (that is, surrounds the first magnetic column 26 or the second magnetic column 28). A first winding direction in which the high-voltage side windings 32H and 36H surround the first magnetic column 26 is substantially opposite to a second winding direction in which the high-voltage side windings 34H and 38H surround the second magnetic column 28.

Specifically, the high-voltage side windings 32H, 34H, 36H, and 38H in FIG. 1 are respectively a first high-voltage side winding 32H, a second high-voltage side winding 34H, a third high-voltage side winding 36H, and a fourth high-voltage side winding 38H. From the view of FIG. 1, the (first) winding direction in which the first high-voltage side winding 32H and the third high-voltage side winding 36H surround the first magnetic column 26 is to come out of the page from the right side of the first magnetic column 26 and go into the page from the left side of the first magnetic column 26. Similarly, the (second) winding direction in which the second high-voltage side winding 34H and the fourth high-voltage side winding 38H surround the second magnetic column 28 is to come out of the page from the left side of the second magnetic column 28 and go into the page from the right side of the second magnetic column 28. Therefore, the first winding direction in which the first and third high-voltage side windings 32H and 36H surround the first magnetic column 26 is substantially opposite to the second winding direction in which the second and fourth high-voltage side windings 34H and 38H surround the second magnetic column 28. In some embodiments, a number of the winding pairs 32 and 36 surrounding the first magnetic column 26 is the same as a number of the winding pairs 34 and 38 surrounding the second magnetic column 28. For example, in the embodiments of FIG. 1, the number of the winding pairs 32 and 36 surrounding the first magnetic column 26 is 2, and the number of the winding pairs 34 and 38 surrounding the second magnetic column 28 is also 2. The winding direction of the first high-voltage side winding 32H may be the direction in which the electrical current flows or the direction from one end to the other end of the first high-voltage side winding 32H. Likewise, the winding directions of the high-voltage side windings 34H, 36H, 38H may be determined by the electrical current or two ends of each of the high-voltage side windings 34H, 36H, 38H.

Although the first winding direction and the second winding direction in the embodiments of FIG. 1 are as described above, the first winding direction and the second winding direction may alternatively be reversed, that is, the first winding direction is to come out of the page from the left side of the first magnetic column 26 and go into the page from the right side of the first magnetic column 26; and the second winding direction is to come out of the page from the right side of the second magnetic column 28 and go into the page from the left side of the second magnetic column 28. Besides, FIG. 1 does not illustrate winding directions of the low-voltage side windings 32L, 34L, 36L, and 38L. It indicates that the winding directions of the low-voltage side windings 32L, 34L, 36L, and 38L may be determined according to requirements.

Therefore, based on the foregoing embodiment, when the transformer receives an alternating current (input voltage), a direction of magnetic flux generated by the high-voltage side windings 32H and 36H surrounding the first magnetic column 26 is opposite to that of magnetic flux generated by the high-voltage side windings 34H and 38H surrounding the second magnetic column 28. Therefore, the transformer forms a closed magnetic circuit by means of the first magnetic core 22, the first magnetic column 26, the second magnetic core 24, and the second magnetic column 28. The low-voltage side windings 32L, 34L, 36L, and 38L each generate a corresponding induced current in response to the magnetic circuit. The induced current passes through a low-voltage side circuit (described later), and the transformer may output a corresponding output voltage. A ratio of the input voltage to the output voltage corresponds to a turn ratio of the high-voltage side windings 32H, 34H, 36H, and 38H to the low-voltage side windings 32L, 34L, 36L, and 38L.

In some embodiments, the magnetic core set 20 includes only a magnetic column pair 26, 28, and the magnetic column pair 26, 28 is formed by a first magnetic column 26 and a second magnetic column 28, that is, the magnetic column pair 26, 28 only includes the first magnetic column 26 and the second magnetic column 28. The high-voltage side windings 32H, 34H, 36H, and 38H and the low-voltage side windings 32L, 34L, 36L, and 38L surround the corresponding first magnetic column 26 or second magnetic column 28. In this way, the 2N winding pairs 30 surround the two magnetic columns 26 and 28, and achieve a voltage conversion effect, so that the volume of the entire transformer is significantly reduced.

Figure 4:
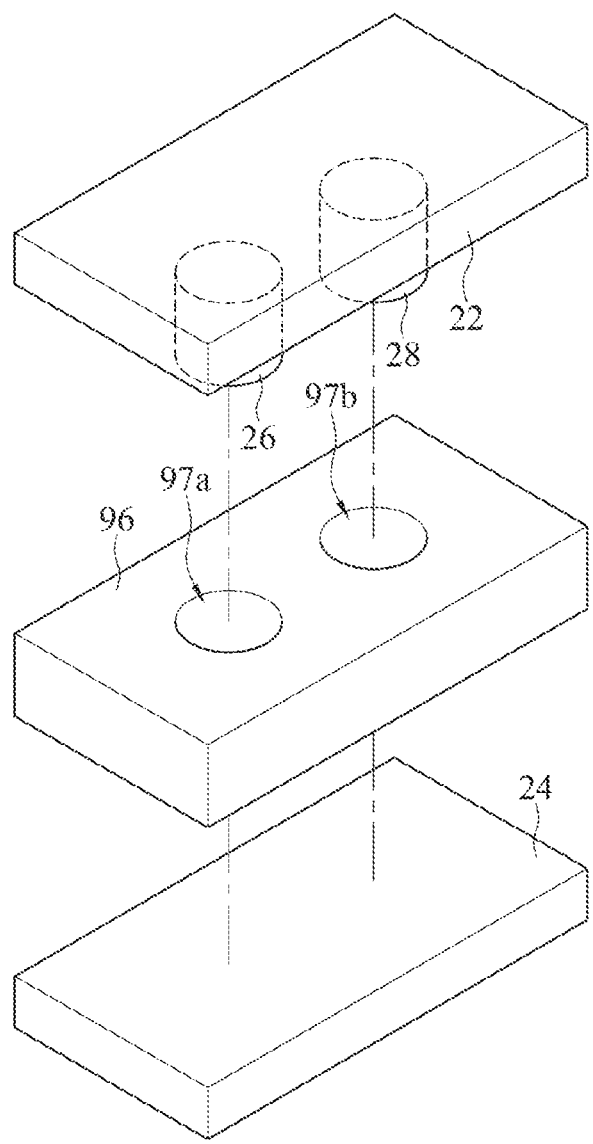
FIG. 4 illustrates a three-dimensional exploded view of a planar transformer according to some embodiments.

In the embodiments shown in FIG. 1, the first magnetic column 26 includes two first magnetic sub-columns 26a and 26b, and the first magnetic sub-columns 26a and 26b are substantially coaxially arranged between the first magnetic core 22 and the second magnetic core 24. The second magnetic column 28 includes two second magnetic sub-columns 28a and 28b, and the second magnetic sub-columns 28a and 28b are substantially coaxially arranged between the first magnetic core 22 and the second magnetic core 24. However, the present disclosure is not limited thereto, and each of the first magnetic column 26 and the second magnetic column 28 may be a single column, as shown in FIG. 4.

In some embodiments, as shown in FIG. 1, the first magnetic sub-column 26a, the first magnetic core 22, and the second magnetic sub-column 28a are integrated as a single-piece component. The first magnetic sub-column 26*b*, the second magnetic core 24, and the second magnetic sub-column 28*b* are integrated into a single-piece component. However, the present disclosure is not limited thereto, and the first magnetic sub-columns 26*a* and 26*b*, the second magnetic sub-columns 28*a* and 28*b*, the first magnetic core 22, and the second magnetic core 24 may be separate components.

In some embodiments, the first magnetic core 22, the first magnetic column 26, the second magnetic core 24, and the second magnetic column 28 form a ring area, the central part of the hatching area which excludes the four horizontal extended portions in FIG. 1. The ring area may be closed or open (non-closed). For example, the two first magnetic sub-columns 26*a* and 26*b* are substantially coaxially arranged with a spacing therebetween, and the two second magnetic sub-columns 28*a* and 28*b* are substantially coaxially arranged with a spacing therebetween. In addition, in the embodiment in which the first magnetic sub-columns 26*a* and 26*b*, the second magnetic sub-columns 28*a* and 28*b*, the first magnetic core 22, and the second magnetic core 24 are separate components, one of two adjacent components may be in contact or have a spacing from the other of the adjacent components. For example, the first magnetic core 22 and the first magnetic sub-column 26*a* are in contact or have a spacing from each other. The first magnetic core 22 and the second magnetic sub-column 28*a* are in contact or have a spacing from each other. The second magnetic core 24 and the first magnetic sub-column 26*b* are in contact or have a spacing from each other. The second magnetic core 24 and the second magnetic sub-column 28*b* are in contact or have a spacing from each other. The spacings may be the same or different.

In the embodiments of FIG. 1, outer sides (left and right sides of FIG. 1) of the first magnetic core 22 and the second magnetic core 24 protrude from outer sides (left and right sides of FIG. 1) of the 2N winding pairs 30, but the present disclosure is not limited thereto. The outer sides of the first magnetic core 22 and the second magnetic core 24 may be aligned with the outer sides of the 2N winding pairs 30 (left and right sides of the winding pairs in FIG. 1, that is, a leftmost side and a rightmost side of the dashed line in FIG. 1), or may be aligned with outer side surfaces of the magnetic column pair 26, 28 (left and right sides of the magnetic column pair in FIG. 1, that is, a left side of the first magnetic column 26 and a right side of the second magnetic column 28).

The high-voltage side windings 32H, 34H, 36H, and 38H may have a series relationship, a parallel relationship, or a series-parallel relationship; and the low-voltage side windings 32L, 34L, 36L, and 38L may have a series relationship, a parallel relationship, or a series-parallel relationship (detailed later). In addition, the number of the 2N winding pairs 30 may also vary depending on requirements of the transformer (for example, an output current or a number of output ports). For example, N may be 3, 4, or 5, which is illustrated later.

Figure 2:
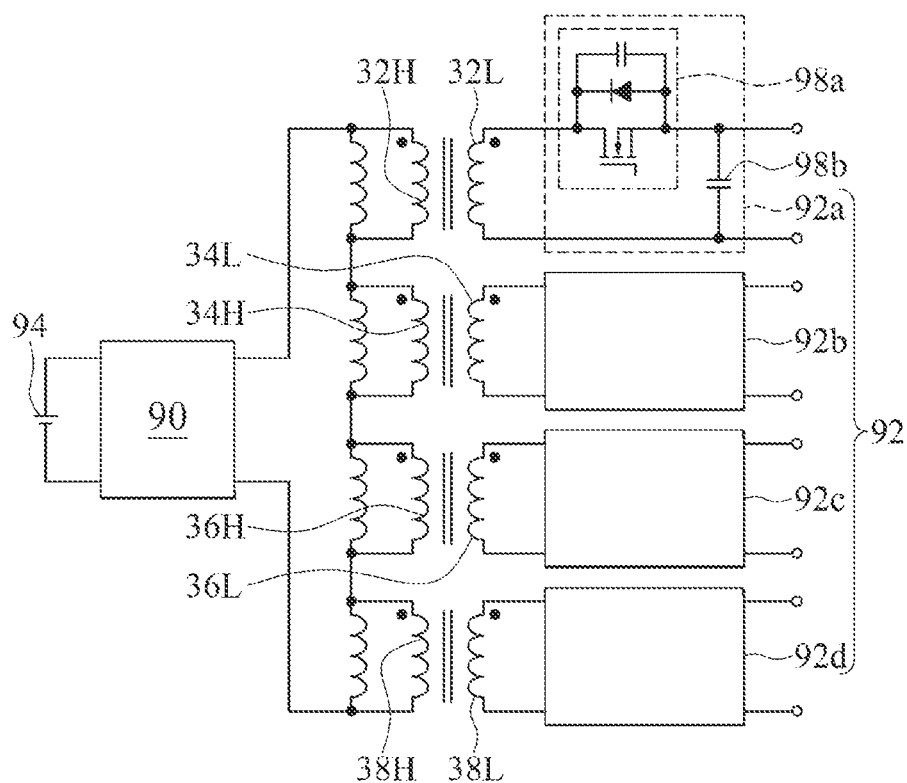
FIG. 2 illustrates a circuit functional block diagram of a transformer according to some embodiments.

FIG. 2 illustrates a circuit functional block diagram of a transformer according to some embodiments. The transformer includes a high-voltage side circuit 90 and a low-voltage side circuit 92. In this embodiment, the transformer includes four low-voltage side circuits 92*a*, 92*b*, 92*c*, and 92*d*. The high-voltage side circuit 90 is adapted to receive an input power source 94, and the input power source 94 may be a direct current power source (as shown in FIG. 2) or an alternating current power source. The high-voltage side circuit 90 is adapted to convert the input power source 94 into a predetermined alternating current and then input the alternating current into the high-voltage side windings 32H, 34H, 36H, and 38H. After the high-voltage side windings 32H, 34H, 36H, and 38H receive the alternating current, the low-voltage side windings 32L, 34L, 36L, and 38L generate induced currents. The low-voltage side circuits 92*a*, 92*b*, 92*c*, and 92*d* rectify the induced currents and output the rectified induced currents to a load. Each of the low-voltage side circuits 92*a*, 92*b*, 92*c*, and 92*d* includes a synchronous rectifier 98*a* and a voltage stabilizing circuit 98*b* (only the first low-voltage side circuit 92*a* is used as an example in FIG. 2 to illustrate a detailed circuit thereof). The synchronous rectifier 98*a* is connected in series to the corresponding low-voltage side winding 32L, and the voltage stabilizing circuit 98*b* is connected in parallel to the corresponding low-voltage side winding 32L.

In the embodiments of FIG. 2, the high-voltage side windings 32H, 34H, 36H, and 38H are connected in series sequentially, while each of the low-voltage side windings 32L, 34L, 36L, and 38L has an independent output. The low-voltage side windings 32L, 34L, 36L, and 38L may alternatively be connected in parallel for output, to increase an output current thereof.

Figure 3:
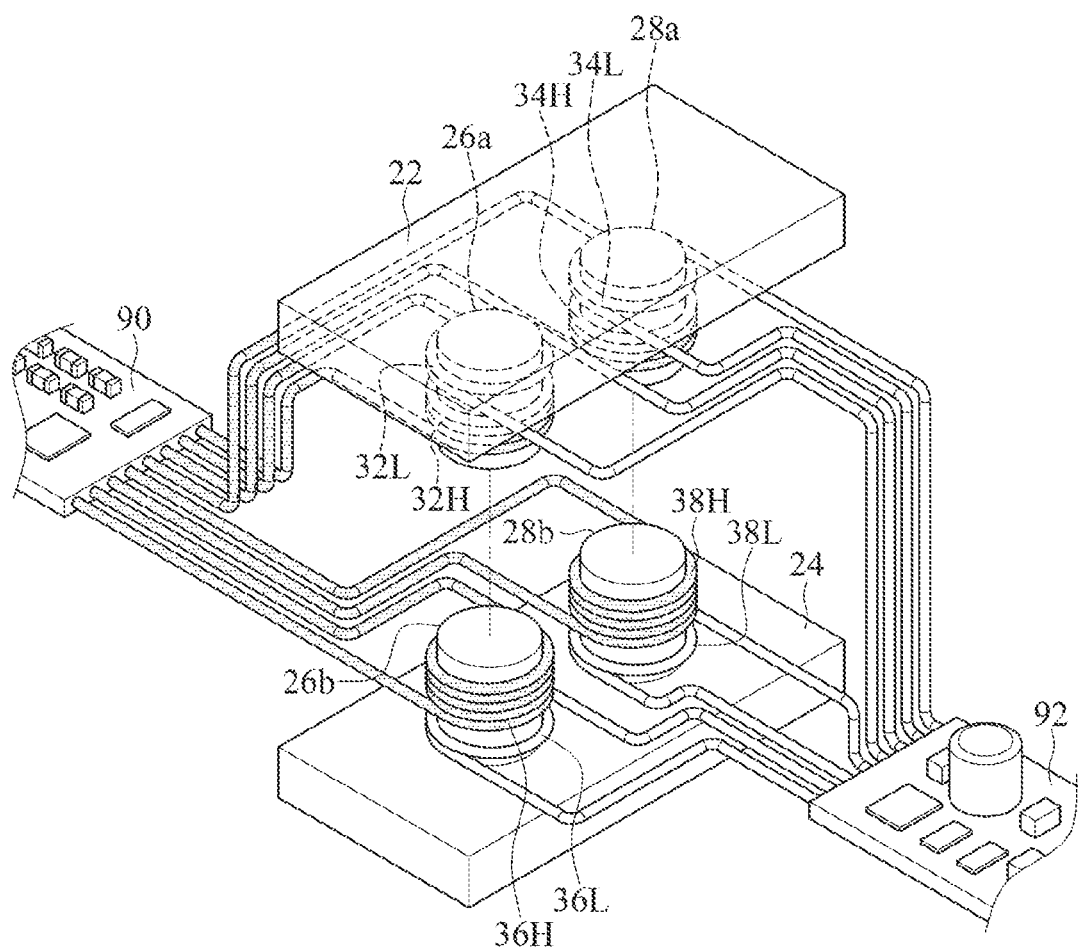
FIG. 3 illustrates a three-dimensional exploded view of a copper-wire transformer according to some embodiments.

FIG. 3 illustrates a three-dimensional exploded view of a copper-wire transformer according to some embodiments. As can be seen in the figure, the copper-wire transformer includes 2N winding pairs 32H, 32L, 34H, 34L, 36H, 36L, 38H, and 38L, where N is equal to 2. The four winding pairs 32H, 32L, 34H, 34L, 36H, 36L, 38H, and 38L are wires in a copper wire form. The wires correspondingly surround the first magnetic sub-columns 26*a* and 26*b* or the second magnetic sub-columns 28*a* and 28*b*, and are electrically connected to the high-voltage side circuit 90 and the low-voltage side circuit 92 respectively. The wires in a copper wire form may be, but not limited to, enameled wires. FIG. 3 illustrates the high-voltage side windings 32H, 34H, 36H, and 38H by using wires with black dot surfaces, and the low-voltage side windings 32L, 34L, 36L, and 38L by using wires with blank surfaces. The illustration manner does not indicate that the high-voltage side windings 32H, 34H, 36H, and 38H and low-voltage side windings 32L, 34L, 36L, and 38L use different types of wires. During implementation, the high-voltage side windings 32H, 34H, 36H, and 38H and the low-voltage side windings 32L, 34L, 36L, and 38L may use the same or different types of wires. The high-voltage side windings 32H, 34H, 36H, and 38H and the low-voltage side windings 32L, 34L, 36L, and 38L are electrically connected to the high-voltage side circuit 90 and the low-voltage side circuit 92 respectively. According to the copper-wire transformer, the four winding pairs 32H, 32L, 34H, 34L, 36H, 36L, 38H, and 38L surround the corresponding first magnetic sub-columns 26*a* and 26*b* or second magnetic sub-columns 28*a* and 28*b*, so that the volume of the transformer is significantly reduced. The embodiments of FIG. 3 can implement the transformer of the circuit functional block diagram in FIG. 2. The present disclosure is not limited thereto. A user may adjust the number of the winding pairs 32H, 32L, 34H, 34L, 36H, 36L, 38H, and 38L in FIG. 3, adjust an electrical connection relationship between the high-voltage side windings 32H, 34H, 36H, and 38H and the high-voltage side circuit 90, and adjust an electrical connection relationship between the low-voltage side windings 32L, 34L, 36L, and 38L and the low-voltage side circuit 92, to implement the embodiments of the transformer in the circuit functional block diagrams shown in FIG. 5, FIG. 7A and FIG. 7B.

FIG. 4 illustrates a three-dimensional exploded view of a planar transformer according to some embodiments. As can be seen in the figure, the planar transformer includes a first magnetic core 22, a second magnetic core 24, a first magnetic column 26, a second magnetic column 28, and a circuit board 96. The circuit board 96 includes two column holes 97a and 97b. The first magnetic column 26 and the second magnetic column 28 are respectively located in the two column holes 97a and 97b. In this embodiment, the circuit board 96 includes a plurality of winding layers, and each winding layer includes a winding. The high-voltage side windings and the low-voltage side windings of the 2N winding pairs 30 are respectively the windings, and the 2N winding pairs 30 correspondingly surround the two column holes 97a and 97b (not shown in the figure). The 2N winding pairs 30 of the planar transformer only surround the two column holes 97a and 97b (that is, the 2N winding pairs 30 surround the first magnetic column 26 and the second magnetic column 28), so that the overall volume of the transformer with the 2N winding pairs 30 can be reduced.

Figure 5:
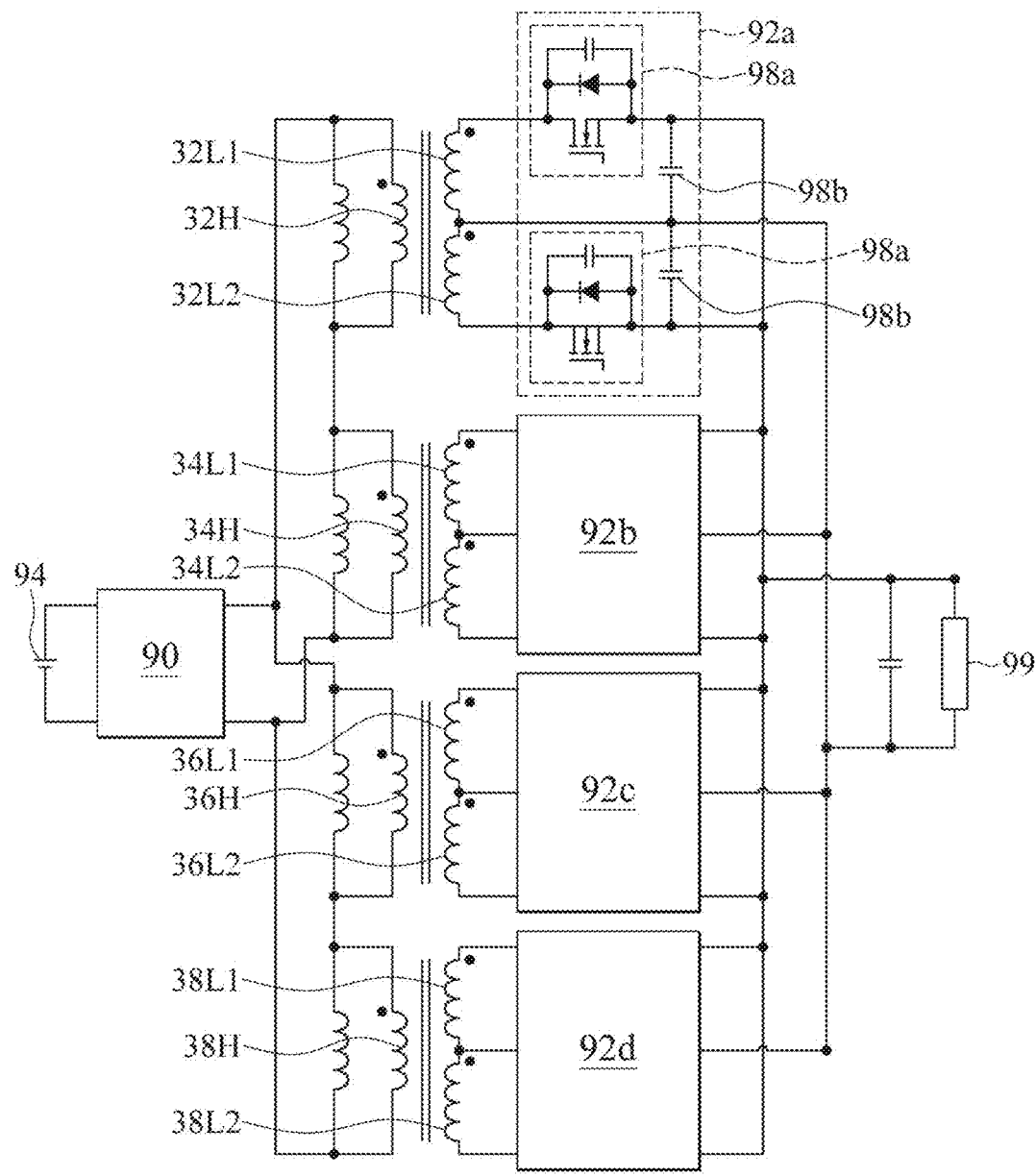
FIG. 5 illustrates a circuit functional block diagram of a transformer according to some embodiments.

FIG. 5 illustrates a circuit functional block diagram of a transformer according to some embodiments. The transformer includes 2N winding pairs 30, where N is equal to 2. The four winding pairs 30 are respectively a first winding pair 32H, 32L1, 32L2, a second winding pair 34H, 34L1, 34L2, a third winding pair 36H, 36L1, 36L2, and a fourth winding pair 38H, 38L1, 38L2. The first winding pair includes a high-voltage side winding 32H and two low-voltage side windings 32L1 and 32L2 (also referred to as low-voltage side sub-windings), which are respectively referred to as a first high-voltage side winding 32H and first low-voltage side windings 32L1 and 32L2 herein. The same applies to the second, third, and fourth winding pairs, and details are not repeated. The first and second high-voltage side windings 32H and 34H are connected in series to form a high-voltage side winding string (referred to as a first high-voltage side winding string below), and the third and fourth high-voltage side windings 36H and 38H are connected in series to form another high-voltage side winding string (referred to as a second high-voltage side winding string below). The two high-voltage side winding strings after the series connection are connected in parallel (the first high-voltage side winding string is connected in parallel to the second high-voltage side winding string). The two low-voltage side windings 32L1 and 32L2 corresponding to the same high-voltage side winding 32H are respectively connected to the corresponding synchronous rectifiers 98a and voltage stabilizing circuits 98b. For example, the two low-voltage side windings 32L1 and 32L2 are respectively connected to the corresponding synchronous rectifiers 98a and the corresponding voltage stabilizing circuits 98b. Outputs of the two synchronous rectifiers 98a are connected in parallel. The two synchronous rectifiers 98a respectively rectify currents of a positive half cycle and a negative half cycle outputted by the corresponding two low-voltage side windings 32L1 and 32L2 and output the rectified currents. The low-voltage side circuits 92a, 92b, 92c, and 92d shown in FIG. 5 are center-tapped rectifiers.

In the embodiments of FIG. 5, the first, second, third, and fourth low-voltage side windings 32L1, 32L2, 34L1, 34L2, 36L1, 36L2, and 38L1, 38L2 are connected in parallel, and the low-voltage side windings connected in parallel are outputted to a load 99. During implementation, the present disclosure is not limited thereto. The first low-voltage side windings 32L1 and 32L2 connected in parallel may be independently outputted to the corresponding load, and the second, third, and fourth low-voltage side windings 34L1, 34L2, 36L1, 36L2, and 38L1, 38L2 connected in parallel respectively may also be independently outputted to the corresponding load. That is, outputs of the two low-voltage side windings 32L1 and 32L2 corresponding to the same high-voltage side winding 32H provide power to the corresponding load separately. The transformer in the functional block diagram shown in FIG. 5 may be implemented as a planar transformer or a copper-wire transformer.

Figure 6:
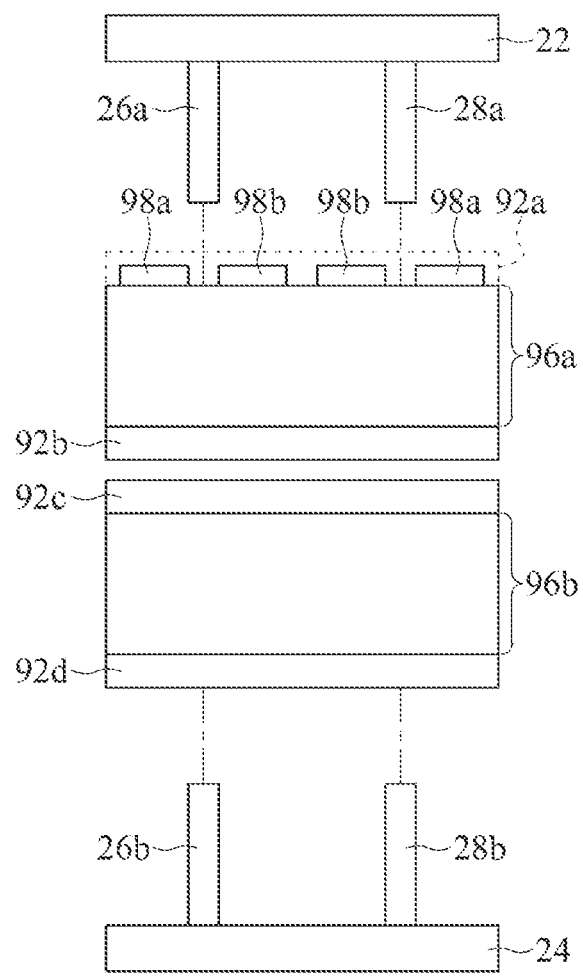
FIG. 6 illustrates a schematic diagram of a side structure of a planar transformer implementing the circuit block diagram of FIG. 5 according to some embodiments.

FIG. 6 illustrates a schematic diagram of a side structure of a planar transformer according to some embodiments. The embodiments of FIG. 6 can implement the circuit block diagram of the transformer of FIG. 5. The planar transformer includes a first magnetic core 22, a second magnetic core 24, a first magnetic column 26 (26a, 26b), a second magnetic column 28 (28a, 28b), and circuit boards 96a and 96b. In this embodiment, the transformer includes two circuit boards 96a and 96b (referred to as a first circuit board 96a and a second circuit board 96b for ease of description). The first circuit board 96a includes a first winding pair 32H, 32L1, 32L2 and a second winding pair 34H, 34L1, 34L2, and the second circuit board 96b includes a third winding pair 36H, 36L1, 36L2 and a fourth winding pair 38H, 38L1, 38L2. The first low-voltage side circuit 92a and the second low-voltage side circuit 92b are respectively arranged on upper and lower surfaces of the first circuit board 96a. The first low-voltage side windings 32L1 and 32L2 are electrically connected to the synchronous rectifier 98a and the voltage stabilizing circuit 98b of the first low-voltage side circuit 92a (which may be electrically connected through via holes of the circuit board 96a, the same below, not shown in the figure). The second low-voltage side windings 34L1 and 34L2 are electrically connected to the second low-voltage side circuit 92b. The third low-voltage side circuit 92c and the fourth low-voltage side circuit 92d are respectively arranged on upper and lower surfaces of the second circuit board 96b. The third low-voltage side windings 36L1 and 36L2 are electrically connected to the third low-voltage side circuit 92c. The fourth low-voltage side windings 38L1 and 38L2 are electrically connected to the fourth low-voltage side circuit 92d.

FIG. 6 illustrates the first low-voltage side circuit 92a between the first circuit board 96a and the first magnetic core 22. In some embodiments, the first low-voltage side circuit 92a is located on the upper surface of the first circuit board 96a. During implementation, the area of the upper surface of the first circuit board 96a may be greater than the area of the lower surface of the first magnetic core 22, and the first low-voltage side circuit 92a is located at a position on which the first circuit board 96a is not covered by the first magnetic core 22. Therefore, when the first circuit board 96a is combined with the first magnetic core 22, the first low-voltage side circuit 92a is located beside the first magnetic core 22. In this way, the first low-voltage side circuit 92a is not sandwiched between the first circuit board 96a and the first magnetic core 22. Similarly, the same applies to the second, third, and fourth low-voltage side circuits 92b, 92c, and 92d, and details are not repeated. In some embodiments, the first and second low-voltage side circuits 92a and 92b are not located on the first circuit board 96a, and the third and fourth low-voltage side circuits 92c and 92d are not located on the second circuit board 96b. The low-voltage side circuits 92a, 92b, 92c, and 92d are located on another circuit board or on a plurality of other circuit boards respectively (not shown in the figure). The low-voltage side circuits 92a, 92b, 92c, and 92d are electrically connected to the low-voltage side windings 32L1, 32L2, 34L1, 34L2, 36L1, 36L2, and 38L1, 38L2 by means of wires (not shown in the figure).

In the embodiments of FIG. 6, the transformer includes two circuit boards 96a and 96b, but the present disclosure is not limited thereto. The transformer may alternatively include only a single circuit board (similar to that shown in FIG. 4). With proper designs of via holes of the circuit board, wiring, and windings, the first, second, third, and fourth low-voltage side circuits 92a, 92b, 92c, and 92d can be respectively arranged on upper and lower surfaces of the single circuit board and electrically connected to the first, second, third, and fourth low-voltage side windings 32L1, 32L2, 34L1, 34L2, 36L1, 36L2, and 38L1, 38L2.

Figure 7A:
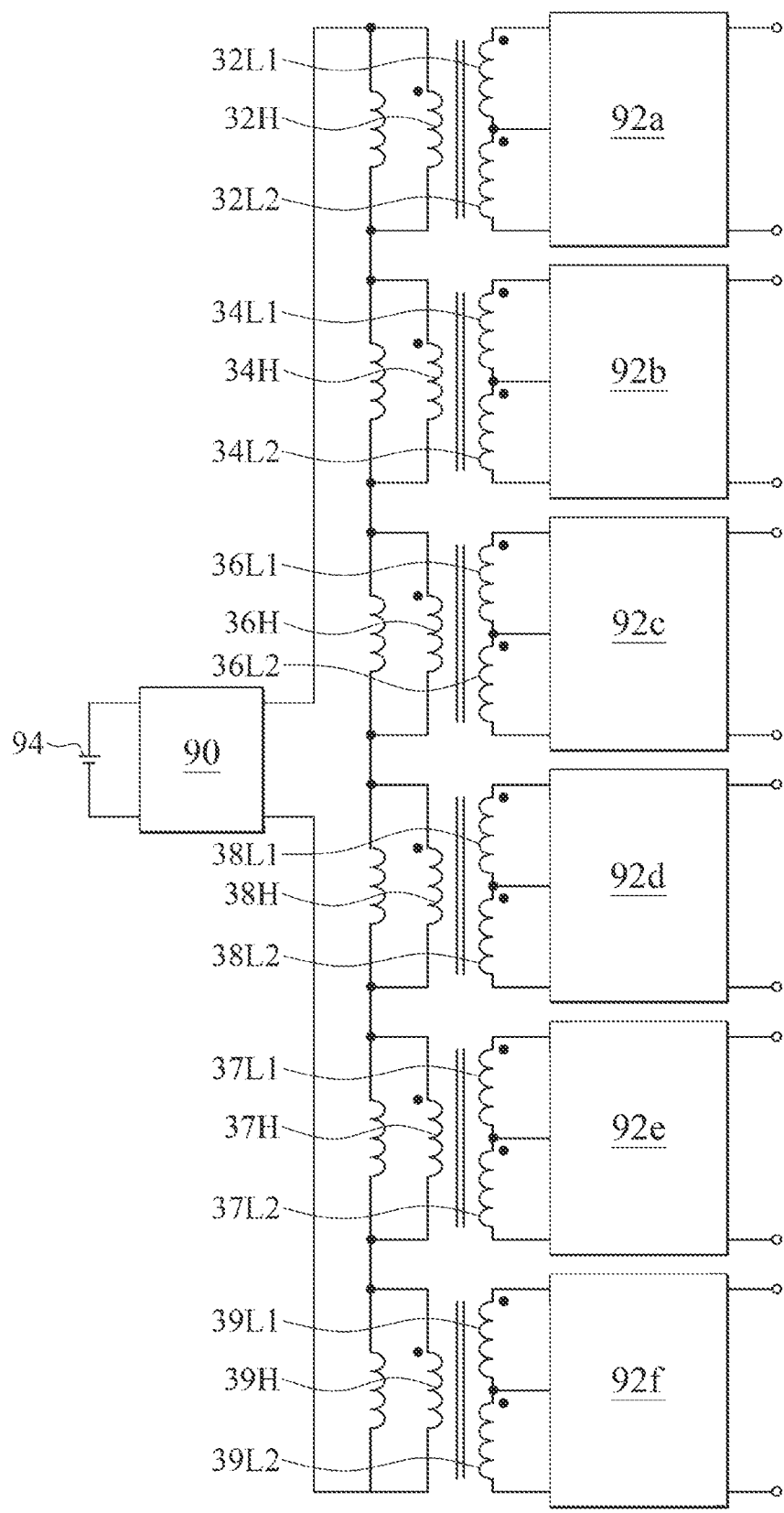
FIG. 7A illustrates a circuit functional block diagram of a transformer according to some embodiments.

FIG. 7A illustrates a circuit functional block diagram of a transformer according to some embodiments. In this embodiment, the transformer includes 2N winding pairs (that is, N is equal to 3, and there are a total of 6 winding pairs), which are respectively a first winding pair 32H, 32L1, 32L2, a second winding pair 34H, 34L1, 34L2, a third winding pair 36H, 36L1, 36L2, a fourth winding pair 38H, 38L1, 38L2, a fifth winding pair 37H, 37L1, 37L2, and a sixth winding pair 39H, 39L1, 39L2. The first high-voltage side winding 32H, the second high-voltage side winding 34H, the third high-voltage side winding 36H, the fourth high-voltage side winding 38H, the fifth high-voltage side winding 37H, and the sixth high-voltage side winding 39H are connected in series sequentially.

The circuit of FIG. 7A is applied to a structure including the first magnetic core 22, the second magnetic core 24, the first magnetic column 26, and the second magnetic column 28 of FIG. 3 or FIG. 4. In some embodiments, the number of the winding pairs surrounding the first magnetic column 26 is the same as the number of the winding pairs surrounding the second magnetic column 28. For example, the first winding pair 32H, 32L1, 32L2, the second winding pair 34H, 34L1, 34L2, and the third winding pair 36H, 36L1, 36L2 surround the first magnetic column 26, and the fourth winding pair 38H, 38L1, 38L2, the fifth winding pair 37H, 37L1, 37L2, and the sixth winding pair 39H, 39L1, 39L2 surround the second magnetic column 28, the quantities of both being 3. In some embodiments, the number of the winding pairs surrounding the first magnetic column 26 is different from the number of the winding pairs surrounding the second magnetic column 28. For example, the first winding pair 32H, 32L1, 32L2, the second winding pair 34H, 34L1, 34L2, the third winding pair 36H, 36L1, 36L2, and the fourth winding pair 38H, 38L1, 38L2 surround the first magnetic column 26, the number being 4; and the fifth winding pair 37H, 37L1, 37L2 and the sixth winding pair 39H, 39L1, 39L2 surround the second magnetic column 28, the number being 2.

The transformer includes six low-voltage side circuits 92a, 92b, 92c, 92d, 92e, and 92f, which are respectively a first low-voltage side circuit 92a, a second low-voltage side circuit 92b, a third low-voltage side circuit 92c, a fourth low-voltage side circuit 92d, a fifth low-voltage side circuit 92e, and a sixth low-voltage side circuit 92f. The first low-voltage side windings 32L1 and 32L2 are connected to the first low-voltage side circuit 92a, and the second low-voltage side windings 34L1 and 34L2 are connected to the second low-voltage side circuit 92b. The rest may be deduced by analogy, and details are not repeated.

The transformer includes a high-voltage side circuit 90 adapted to convert an input power source 94 into a predetermined alternating current and then input the alternating current into the high-voltage side windings 32H, 34H, 36H, 38H, 37H, and 39H connected in series. The low-voltage side windings 32L1, 32L2, 34L1, 34L2, 36L1, 36L2, 38L1, 38L2, 37L1, 37L2, and 39L1, 39L2 generate induced currents in response to the alternating current of the high-voltage side windings 32H, 34H, 36H, 38H, 37H and 39H. The induced currents of the low-voltage side windings 32L1, 32L2, 34L1, 34L2, 36L1, 36L2, 38L1, 38L2, 37L1, 37L2, and 39L1, 39L2 pass through the corresponding low-voltage side circuits 92a, 92b, 92c, 92d, 92e, and 92f, and are respectively outputted by the six low-voltage side circuits 92a, 92b, 92c, 92d, 92e, and 92f. The outputs of the six low-voltage side circuits 92a, 92b, 92c, 92d, 92e, and 92f may be connected in series, in parallel, in parallel after being partially connected in series, or in series after being partially connected in parallel, depending on the number of loads and the voltage and current required by the load. The transformer in the functional block diagram shown in FIG. 7A may be implemented as a planar transformer or a copper-wire transformer. In some embodiments, the low-voltage side circuits 92a, 92b, 92c, 92d, 92e, and 92f are full-wave rectifiers of a center-tapped transformer.

Figure 7B:
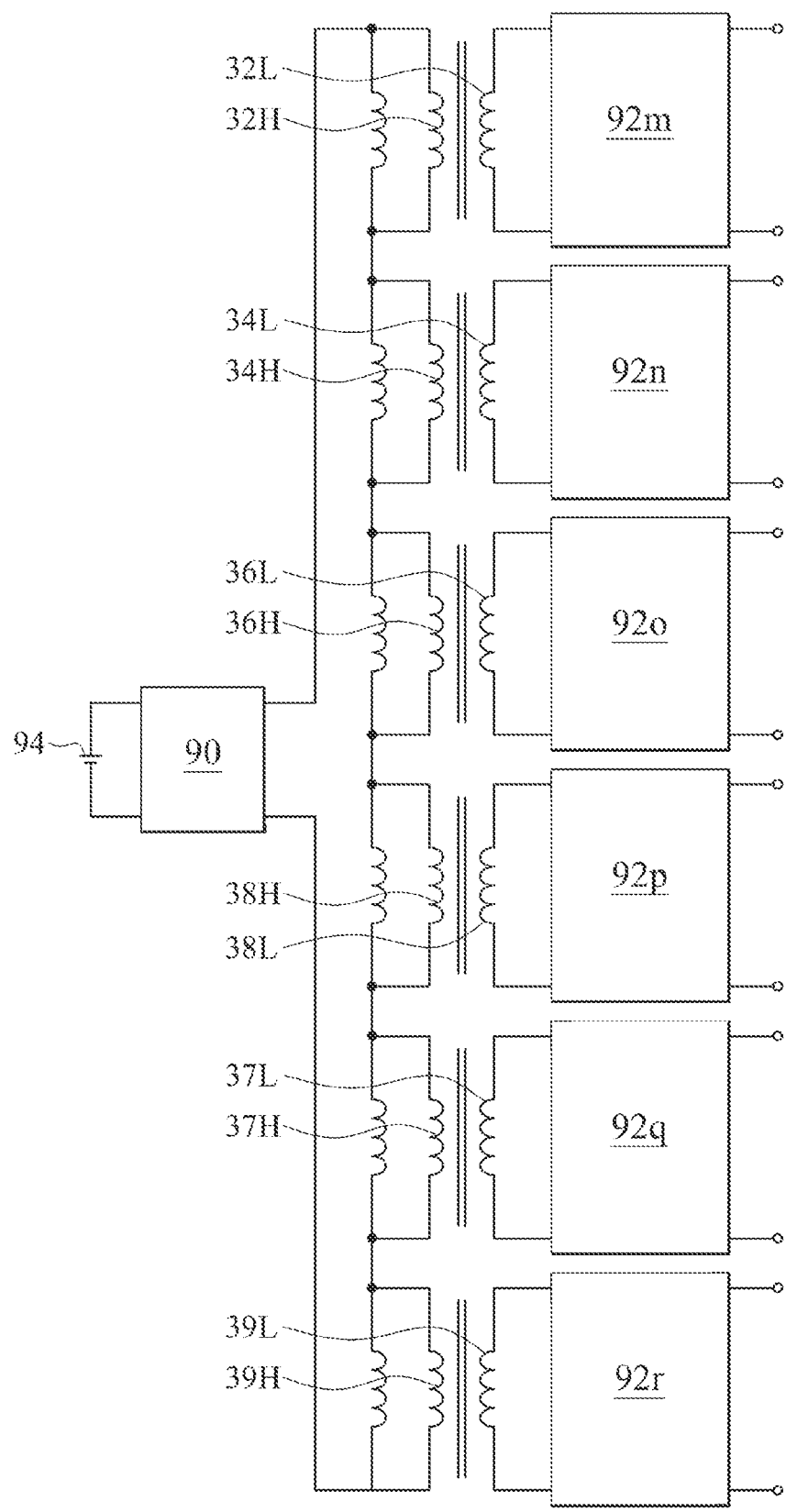
FIG. 7B illustrates a circuit functional block diagram of a transformer according to some embodiments.

FIG. 7B illustrates a circuit functional block diagram of a transformer according to some embodiments. In this embodiment, the transformer includes 2N winding pairs (that is, N is equal to 3, and there are a total of 6 winding pairs), which are respectively a first winding pair 32H, 32L, a second winding pair 34H, 34L, a third winding pair 36H, 36L, a fourth winding pair 38H, 38L, a fifth winding pair 37H, 37L, and a sixth winding pair 39H, 39L. The transformer includes six low-voltage side circuits 92m, 92n, 92o, 92p, 92q, and 92r, and the low-voltage side circuits 92m, 92n, 92o, 92p, 92q, and 92r respectively correspond to low-voltage side windings 32L, 34L, 36L, 38L, 37L, and 39L of the winding pairs. In some embodiments, the low-voltage side circuits 92m, 92n, 92o, 92p, 92q, and 92r are full bridge rectifiers.

Figure 8:
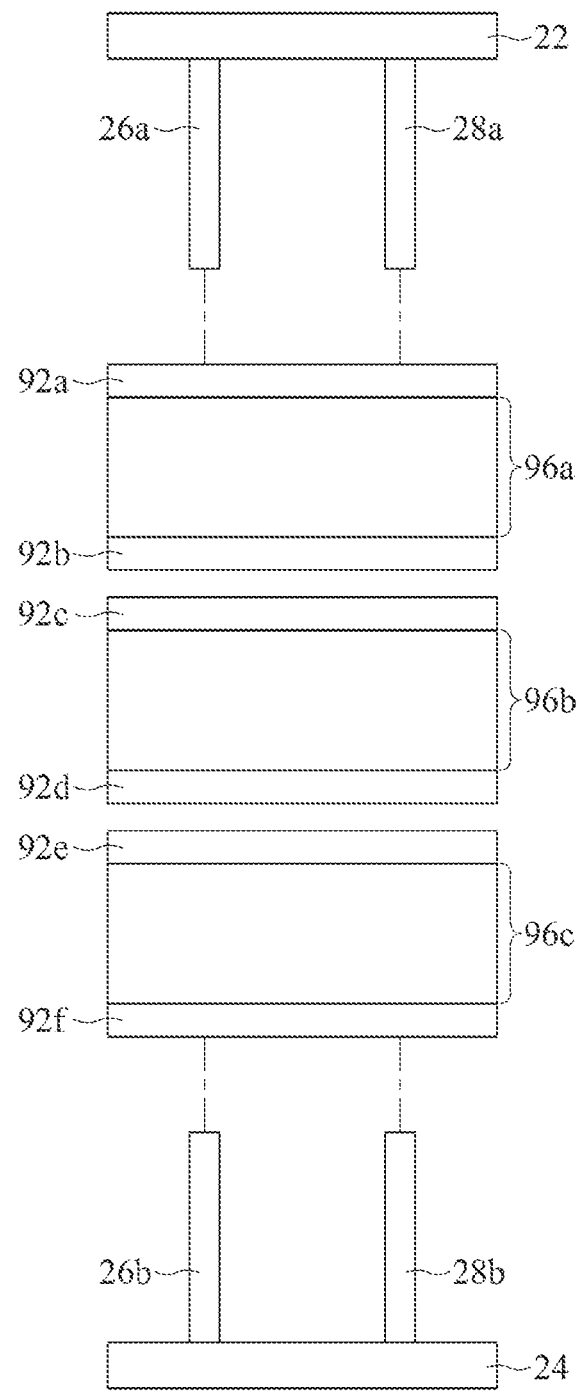
FIG. 8 illustrates a schematic diagram of a side structure of a planar transformer implementing the circuit block diagram of FIG. 7 according to some embodiments.

FIG. 8 illustrates a schematic diagram of a side structure of a planar transformer according to some embodiments. The embodiments of FIG. 8 can implement the circuit block diagram of the transformer of FIG. 7A or FIG. 7B. The planar transformer includes a first magnetic core 22, a second magnetic core 24, a first magnetic column 26 (26a, 26b), a second magnetic column 28 (28a, 28b), and circuit boards 96a, 96b, and 96c. In this embodiment, the transformer includes a first circuit board 96a, a second circuit board 96b, and a third circuit board 96c. The first circuit board 96a includes a first winding pair 32H, 32L1, 32L2 and a second winding pair 34H, 34L1, 34L2, the second circuit board 96b includes a third winding pair 36H, 36L1, 36L2 and a fourth winding pair 38H, 38L1, 38L2, and the third circuit board 96c includes a fifth winding pair 37H, 37L1, 37L2 and a sixth winding pair 39H, 39L1, 39L2. The first low-voltage side circuit 92a and the second low-voltage side circuit 92b are respectively arranged on upper and lower surfaces of the first circuit board 96a. The first low-voltage side windings 32L1 and 32L2 are electrically connected to the first low-voltage side circuit 92a. The second low-voltage side windings 34L1 and 34L2 are electrically connected to the second low-voltage side circuit 92b. The third low-voltage side circuit 92c and the fourth low-voltage side circuit 92d are respectively arranged on upper and lower surfaces of the second circuit board 96b. The third low-voltage side windings 36L1 and 36L2 are electrically connected to the third low-voltage side circuit 92c. The fourth low-voltage side windings 38L1 and 38L2 are electrically connected to the fourth low-voltage side circuit 92d. The fifth low-voltage side circuit 92e and the sixth low-voltage side circuit 92f are respectively arranged on upper and lower surfaces of the third circuit board 96c. The fifth low-voltage side windings 37L1 and 37L2 are electrically connected to the fifth low-voltage side circuit 92e. The sixth low-voltage side windings 39L1 and 39L2 are electrically connected to the sixth low-voltage side circuit 92f.

Similar to the embodiments in FIG. 6, the low-voltage side circuits 92a, 92b, 92c, 92d, 92e, and 92f of the embodiments in FIG. 8 are electrically connected to the low-voltage side windings 32L1, 32L2, 34L1, 34L2, 36L1, 36L2, 38L1, 38L2, 37L1, 37L2, and 39L1, 39L2 respectively. The low-voltage side circuits 92a, 92b, 92c, 92d, 92e, and 92f may be respectively located on the first, second, or third circuit boards 96a, 96b, 96c or on other circuit boards.

Figure 9:
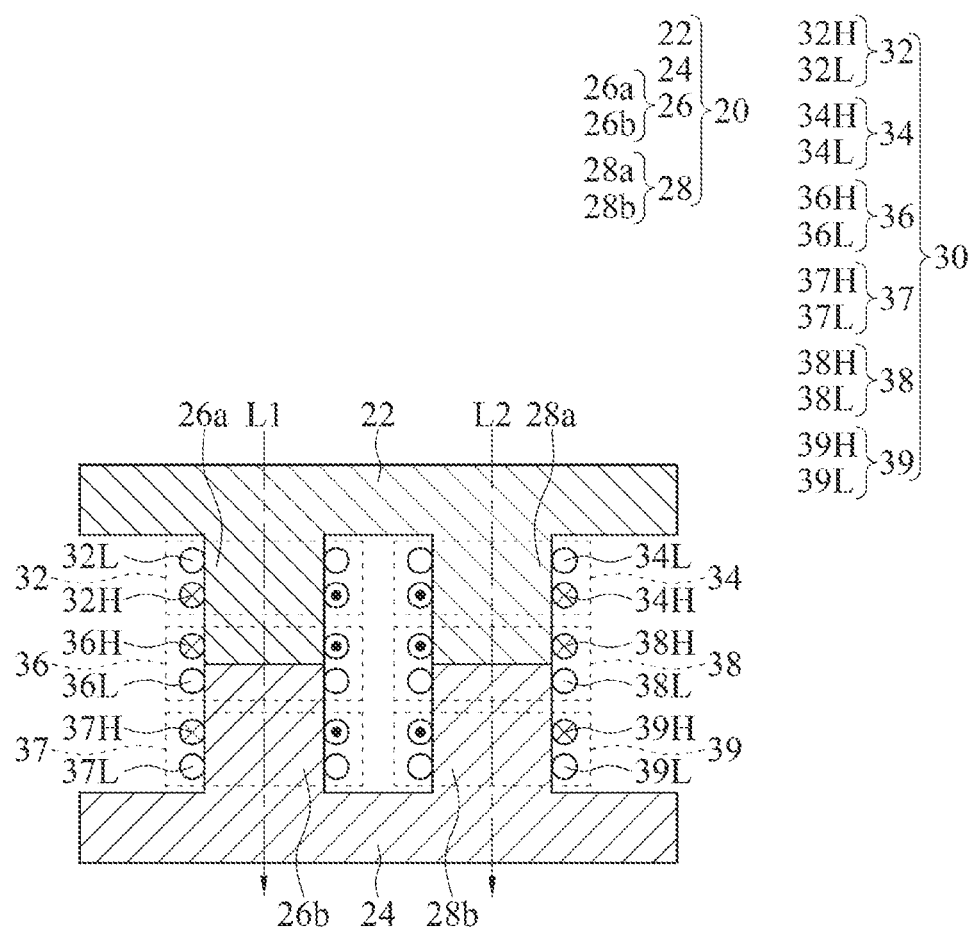
FIG. 9 illustrates a schematic cross-sectional view of a transformer according to some embodiments.

FIG. 9 illustrates a schematic cross-sectional view of a transformer according to some embodiments. The transformer includes a first magnetic core 22, a second magnetic core 24, a first magnetic column 26 (26a, 26b), a second magnetic column 28 (28a, 28b), and 2N winding pairs 30 (that is, N is equal to 3, and there are a total of six winding pairs 30). The winding pairs surrounding the first magnetic sub-columns 26a and 26b are sequentially a first winding pair 32, a second winding pair 36, and a third winding pair 37 in a long axial direction L1 (referred to as a first long axial direction below) of the first magnetic sub-columns 26a and 26b. The winding pairs surrounding the second magnetic sub-columns 28a and 28b are sequentially a sixth winding pair 34, a fifth winding pair 38, and a fourth winding pair 39 in a long axial direction L2 (referred to as a second long axial direction below) of the second magnetic sub-columns 28a and 28b. The long axial direction L1 (the first long axial direction) of the first magnetic sub-columns 26a and 26b and the long axial direction L2 (the second long axial direction) of the second magnetic sub-columns 28a and 28b are parallel and in a same direction. As can be seen in FIG. 9, the first long axial direction L1 and the second long axial direction L2 are a downward direction from the view of FIG. 9. In some embodiments, the high-voltage side windings 32H, 34H, 38H, 36H, 37H, and 39H of the first winding pair 32, the sixth winding pair 34, the fifth winding pair 38, the second winding pair 36, the third winding pair 37, and the fourth winding pair 39 are connected in series sequentially. That is, the first high-voltage side winding 32H, the sixth high-voltage side winding 34H, the fifth high-voltage side winding 38H, the second high-voltage side winding 36H, the third high-voltage side winding 37H, and the fourth high-voltage side winding 39H are connected in series sequentially. The first low-voltage side winding 32L, the sixth low-voltage side winding 34L, the fifth low-voltage side winding 38L, the second low-voltage side winding 36L, the third low-voltage side winding 37L, and the fourth low-voltage side winding 39L may be outputted separately, outputted after being connected in series, outputted in series after being partially connected in parallel, or outputted in parallel after being partially connected in series, depending on the load. In some embodiments, each winding pair includes a plurality of low-voltage side windings (also referred to as low-voltage side sub-windings). The connection relationship and functions are as described above, and details are not repeated.

In some embodiments, the transformer in FIG. 9 is a planar transformer, and the planar transformer includes a plurality of winding layers. The winding layers are divided into a first layer section, a second layer section, and a third layer section from top to bottom (from the view of FIG. 9). Each layer section includes a plurality of winding layers. The first winding pair 32 and the sixth winding pair 34 are located in the first layer section, the second winding pair 36 and the fifth winding pair 38 are located in the second layer section, and the third winding pair 37 and the fourth winding pair 39 are located in the third layer section. The first high-voltage side winding 32H and the sixth high-voltage side winding 34H may be electrically connected by wires or via holes on the circuit board. The sixth high-voltage side winding 34H and the fifth high-voltage side winding 38H may be electrically connected by via holes on the circuit board or external wires. The via hole may be a plated through hole, a blind via hole, or a buried via hole. The rest may be deduced by analogy.

According to some embodiments, the first high-voltage side winding 32H, the second high-voltage side winding 36H, and the third high-voltage side winding 37H are connected in series sequentially to form a first high-voltage side winding string 32H, 36H, 37H; and the sixth high-voltage side winding 34H, the fifth high-voltage side winding 38H, and the fourth high-voltage side winding 39H are connected in series sequentially to form a second high-voltage side winding string 34H, 38H, 39H. The first high-voltage side winding string 32H, 36H, 37H and the second high-voltage side winding string 34H, 38H, 39H are connected in parallel.

According to some embodiments, the first high-voltage side winding 32H, the second high-voltage side winding 36H, the third high-voltage side winding 37H, the fourth high-voltage side winding 39H, the fifth high-voltage side winding 38H, and the sixth high-voltage side winding 34H are connected in series sequentially.

In summary, in some embodiments, the transformer includes 2N winding pairs, and each of the winding pairs surrounds the first magnetic column or the second magnetic column. With this structure, the 2N winding pairs can be effectively integrated into the magnetic core set including the first magnetic column and the second magnetic column, so that the volume of the transformer is reduced.

What is claimed is:

1. A transformer, comprising:
a magnetic core set, comprising:
a first magnetic core;
a second magnetic core, parallel to the first magnetic core; and
a magnetic column pair, comprising a first magnetic column and a second magnetic column, the first magnetic column being substantially parallel to the second magnetic column, wherein the first magnetic column and the second magnetic column are between the first magnetic core and the second magnetic core, and a number of the magnetic columns is two; and 2N winding pairs, wherein N is a positive integer greater than or equal to 2, each of the winding pairs comprises a high-voltage side winding and a low-voltage side winding, each of the winding pairs surrounds one of the first magnetic column and the second magnetic column, and a first winding direction in which the high-voltage side windings surround the first magnetic column is substantially opposite to a second winding direction in which the high-voltage side windings surround the second magnetic column, and
outer sides of the first magnetic core and the second magnetic core are aligned with or protrude from outer sides of the 2N winging pairs.

2. The transformer according to claim 1, wherein the high-voltage side windings are connected in series sequentially.

3. The transformer according to claim 2, wherein each of the low-voltage side windings comprises a plurality of low-voltage side sub-windings, and the low-voltage side sub-windings are connected in parallel.

4. The transformer according to claim 3, wherein a number of the winding pairs surrounding the first magnetic column is the same as a number of the winding pairs surrounding the second magnetic column.

5. The transformer according to claim 2, wherein a number of the winding pairs surrounding the first magnetic column is the same as a number of the winding pairs surrounding the second magnetic column.

6. The transformer according to claim 1, further comprising a circuit board, wherein the circuit board comprises a plurality of winding layers, each of the winding layers comprises a winding, and the high-voltage side windings and the low-voltage side windings are respectively the windings of the plurality of winding layers.

7. The transformer according to claim 6, wherein N is equal to 2, the high-voltage side windings are connected in series sequentially, each of the low-voltage side windings comprises a plurality of low-voltage side sub-windings, and the low-voltage side sub-windings are connected in parallel.

8. The transformer according to claim 6, wherein each of the low-voltage side windings comprises a plurality of low-voltage side sub-windings, and the low-voltage side sub-windings are connected in parallel.

9. The transformer according to claim 8, wherein a number of the winding pairs surrounding the first magnetic column is the same as a number of the winding pairs surrounding the second magnetic column.

10. The transformer according to claim 6, wherein N is equal to 3, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the second winding pair, the third winding pair, the fourth winding pair, the fifth winding pair, and the sixth winding pair are connected in series sequentially.

11. The transformer according to claim 6, wherein N is equal to 3, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the sixth winding pair, the fifth winding pair, the second winding pair, the third winding pair, and the fourth winding pair are connected in series sequentially.

12. The transformer according to claim 6, further comprising a high-voltage side circuit and a low-voltage side circuit, wherein N is equal to 2, the four winding pairs are respectively a first winding pair, a second winding pair, a third winding pair, and a fourth winding pair, each of the winding pairs comprises a high-voltage side winding and two low-voltage side windings, the high-voltage side winding of the first winding pair and the high-voltage side winding of the second winding pair are connected in series to form a first high-voltage side winding string, the high-voltage side winding of the third winding pair and the high-voltage side winding of the fourth winding pair are connected in series to form a second high-voltage side winding string, the first high-voltage side winding string and the second high-voltage side winding string are connected in parallel and then electrically connected to the high-voltage side circuit, and the two low-voltage side windings of each of the winding pairs are electrically connected to the low-voltage side circuit separately.

13. The transformer according to claim 12, wherein a number of the winding pairs surrounding the first magnetic column is the same as a number of the winding pairs surrounding the second magnetic column.

14. The transformer according to claim 1, further comprising:
a high-voltage side circuit, electrically connected to the high-voltage side windings, wherein the high-voltage side circuit is adapted to receive a power source to output an alternating current to the high-voltage side windings; and
a plurality of low-voltage side circuits, electrically connected to the low-voltage side windings separately, wherein each of the low-voltage side circuits comprises a synchronous rectifier and a voltage stabilizing circuit, each of the synchronous rectifiers is connected in series to the corresponding low-voltage side winding, and each of the voltage stabilizing circuits is connected in parallel with the corresponding low-voltage side winding.

15. The transformer according to claim 1, wherein the high-voltage side windings and the low-voltage side windings are wires in a copper wire form.

16. The transformer according to claim 15, wherein N is equal to 2, the high-voltage side windings are connected in series sequentially, each of the low-voltage side windings comprises a plurality of low-voltage side sub-windings, and the low-voltage side sub-windings are connected in parallel.

17. The transformer according to claim 15, wherein each of the low-voltage side windings comprises a plurality of low-voltage side sub-windings, and the low-voltage side sub-windings are connected in parallel.

18. The transformer according to claim 15, wherein N is equal to 3, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the second winding pair, the third winding pair, the fourth winding pair, the fifth winding pair, and the sixth winding pair are connected in series sequentially.

19. The transformer according to claim 15, wherein N is equal to 3, the winding pairs surrounding the first magnetic column are sequentially a first winding pair, a second winding pair, and a third winding pair in a long axial direction of the first magnetic column, the winding pairs surrounding the second magnetic column are sequentially a sixth winding pair, a fifth winding pair, and a fourth winding pair in a long axial direction of the second magnetic column, the long axial direction of the first magnetic column and the long axial direction of the second magnetic column are parallel and in a same direction, and the high-voltage side windings of the first winding pair, the sixth winding pair, the fifth winding pair, the second winding pair, the third winding pair, and the fourth winding pair are connected in series sequentially.

20. The transformer according to claim 1, wherein a number of the winding pairs surrounding the first magnetic column is the same as a number of the winding pairs surrounding the second magnetic column.

\* \* \* \* \*